US012084356B2

(12) United States Patent
Carter et al.

(10) Patent No.: US 12,084,356 B2
(45) Date of Patent: Sep. 10, 2024

(54) TUNGSTEN OXIDE-BASED MATERIAL

(71) Applicant: WILLIAM BLYTHE LIMITED, Essex (GB)

(72) Inventors: Mark Carter, Essex (GB); Jack Carroll, Essex (GB); David Crossley, Essex (GB)

(73) Assignee: WILLIAM BLYTHE LIMITED, Essex (GB)

( * ) Notice: Subject to any disclaimer, the term of this patent is extended or adjusted under 35 U.S.C. 154(b) by 1276 days.

(21) Appl. No.: 16/610,600

(22) PCT Filed: Feb. 2, 2018

(86) PCT No.: PCT/GB2018/050316
§ 371 (c)(1),
(2) Date: Nov. 4, 2019

(87) PCT Pub. No.: WO2018/203023
PCT Pub. Date: Nov. 8, 2018

(65) Prior Publication Data
US 2020/0062611 A1 Feb. 27, 2020

(30) Foreign Application Priority Data
May 5, 2017 (GB) .................... 1707255

(51) Int. Cl.
C01G 41/00 (2006.01)
C01G 41/02 (2006.01)
(52) U.S. Cl.
CPC ........... *C01G 41/006* (2013.01); *C01G 41/02* (2013.01); *C01P 2002/54* (2013.01); *C01P 2002/72* (2013.01)

(58) Field of Classification Search
CPC .............................. C01G 41/006; C01G 41/02
See application file for complete search history.

(56) References Cited

U.S. PATENT DOCUMENTS

| | | | |
|---|---|---|---|
| 6,048,621 | A | 4/2000 | Gallego et al. |
| 7,011,691 | B2 | 3/2006 | Abe |
| 7,569,167 | B2 | 8/2009 | Abe |
| 7,687,141 | B2 | 3/2010 | Yabuki |
| 8,083,847 | B2 | 12/2011 | Takeda et al. |

(Continued)

FOREIGN PATENT DOCUMENTS

| | | |
|---|---|---|
| AU | 2011253581 A1 | 12/2011 |
| CN | 102963933 A | 3/2013 |

(Continued)

OTHER PUBLICATIONS

PCT Search Report dated Apr. 10, 2018 issued in corresponding International Application No. PCT/GB2018/050316.

(Continued)

*Primary Examiner* — James A Fiorito
(74) *Attorney, Agent, or Firm* — Kilyk & Bowersox, P.L.L.C.

(57) ABSTRACT

A material of Formula (I)

$$M_yA_xWO_z \qquad (I)$$

where M represents one or more monoatomic species,
A represents one or more polyatomic cationic species, each having an ionic radius of no more than 2 Å,
W is tungsten, O is oxygen, y is non-zero and is up to and including 0.32, x is non-zero and up to and including 0.32, and z is from 2.5 to 4.0, provided that x+y≤0.33.

12 Claims, 1 Drawing Sheet

(56) References Cited

U.S. PATENT DOCUMENTS

| | | |
|---|---|---|
| 8,980,135 B2 | 3/2015 | Takeda et al. |
| 2005/0271566 A1 | 12/2005 | Yadav |
| 2006/0178254 A1 | 8/2006 | Takeda et al. |
| 2006/0209383 A1 | 9/2006 | Burdis et al. |
| 2007/0187653 A1 | 8/2007 | Takeda et al. |
| 2010/0140533 A1 | 6/2010 | Fujita |
| 2010/0219654 A1 | 9/2010 | Fujita |
| 2011/0143116 A1 | 6/2011 | Chung et al. |
| 2012/0138842 A1 | 6/2012 | Fu et al. |
| 2013/0200292 A1 | 8/2013 | Fung et al. |
| 2014/0242381 A1 | 8/2014 | Fu et al. |
| 2014/0377567 A1 | 12/2014 | Ii et al. |
| 2015/0030802 A1 | 1/2015 | Chen et al. |
| 2015/0153478 A1 | 6/2015 | Takeda et al. |
| 2016/0122524 A1 | 5/2016 | Machida et al. |
| 2016/0160052 A1 | 6/2016 | Su et al. |
| 2016/0178804 A1 | 6/2016 | Shen et al. |
| 2016/0346768 A1 | 12/2016 | Wrobel et al. |
| 2017/0131446 A1 | 5/2017 | Fujita |

FOREIGN PATENT DOCUMENTS

| | | |
|---|---|---|
| CN | 103449526 A | 12/2013 |
| CN | 104341007 A | 2/2015 |
| CN | 104445416 A | 3/2015 |
| CN | 105680021 A | 6/2016 |
| CN | 107083161 A | 8/2017 |
| CS | 258950 B1 | 9/1988 |
| DE | 102015209638 A1 | 7/2016 |
| EP | 2143762 A1 | 1/2010 |
| IN | 107200357 A | 9/2017 |
| JP | H01172325 A | 7/1989 |
| JP | H09111186 A | 4/1997 |
| JP | 2004043851 A | 2/2004 |
| JP | 2007314752 A | 12/2007 |
| JP | 2010075775 A | 4/2010 |
| JP | 4586970 B2 | 11/2010 |
| JP | 5034272 B2 | 9/2012 |
| JP | 5070796 B2 | 11/2012 |
| JP | 5136832 B2 | 2/2013 |
| JP | 5234237 B2 | 7/2013 |
| JP | 5343697 B2 | 11/2013 |
| JP | 2015105328 A | 6/2015 |
| JP | 2015117353 A | 6/2015 |
| JP | 6217353 B2 | 10/2017 |
| JP | 6225670 B2 | 11/2017 |
| KR | 101458831 B1 | 11/2014 |
| NO | 2016121843 A1 | 8/2016 |
| TW | I291455 B | 12/2007 |
| WO | 2005037932 A1 | 4/2005 |
| WO | 2006025470 A1 | 3/2006 |
| WO | 2006049025 A1 | 5/2006 |
| WO | 2015010575 A1 | 1/2015 |
| WO | 2015010757 A1 | 1/2015 |
| WO | 2016010156 A1 | 1/2016 |
| WO | 2016121844 A1 | 7/2016 |
| WO | 2017073691 A1 | 5/2017 |
| WO | 2018020819 A1 | 2/2018 |
| WO | 2018123096 A1 | 7/2018 |
| WO | 2018203025 A1 | 11/2018 |

OTHER PUBLICATIONS

Chintalapalle et al., TMS2015 Annual Meeting & Exhibition, "Evaluation of Titanium and Nitrogen Doped Tungsten Oxide Thin Films for Application in Solar Energy Conversion," 2015.

Gier et al., "New Lithium, Ammonium, and Tin Hexagonal Tungsten Bronzes Prepared Hydrothermally," Notes, E.I. Du Pont Dr Nemours and Co., 1968, vol. 7:8, pp. 1646-1647.

Guo et al., "Synthesis of $W_{18}O_{49}$ Nanorod via Ammonium Tungsten Oxide and Its Interesting Optical Properties," Langmuir, 2011, vol. 27:19, pp. 12172-12178.

Lee et al., "Facile fabrication of high-efficiency near-infrared absorption film with tungsten bronze nanoparticle dense ayer," Nanoscale Research Letters, 2014, vol. 9(1):294.

Neri et al., "Tungsten Oxide Nanowires-Based Ammonia Gas Sensors," Sensor Letters, Aug. 2008, vol. 6(4), pp. 590-595.

Szalay et al., "Ion exchange adsorption processes on the surface of ammonium tungsten oxide bronze in aqueous media," Journal of Materials Science, 1987, vol. 22:10, pp. 3543-3546.

UKIPO Search Report dated Oct. 31, 2017 issued in corresponding GB Application No. GB1707255.4.

UKIPO Search Report dated Oct. 31, 2017 issued in corresponding GB Application No. GB1707253.9.

PCT Search Report dated Mar. 27, 2018 issued in corresponding International Application No. PCT/GB2018/050316.

PCT Search Report and Written Opinion dated Apr. 10, 2018 issued in corresponding International Application No. PCT/GB2018/050316.

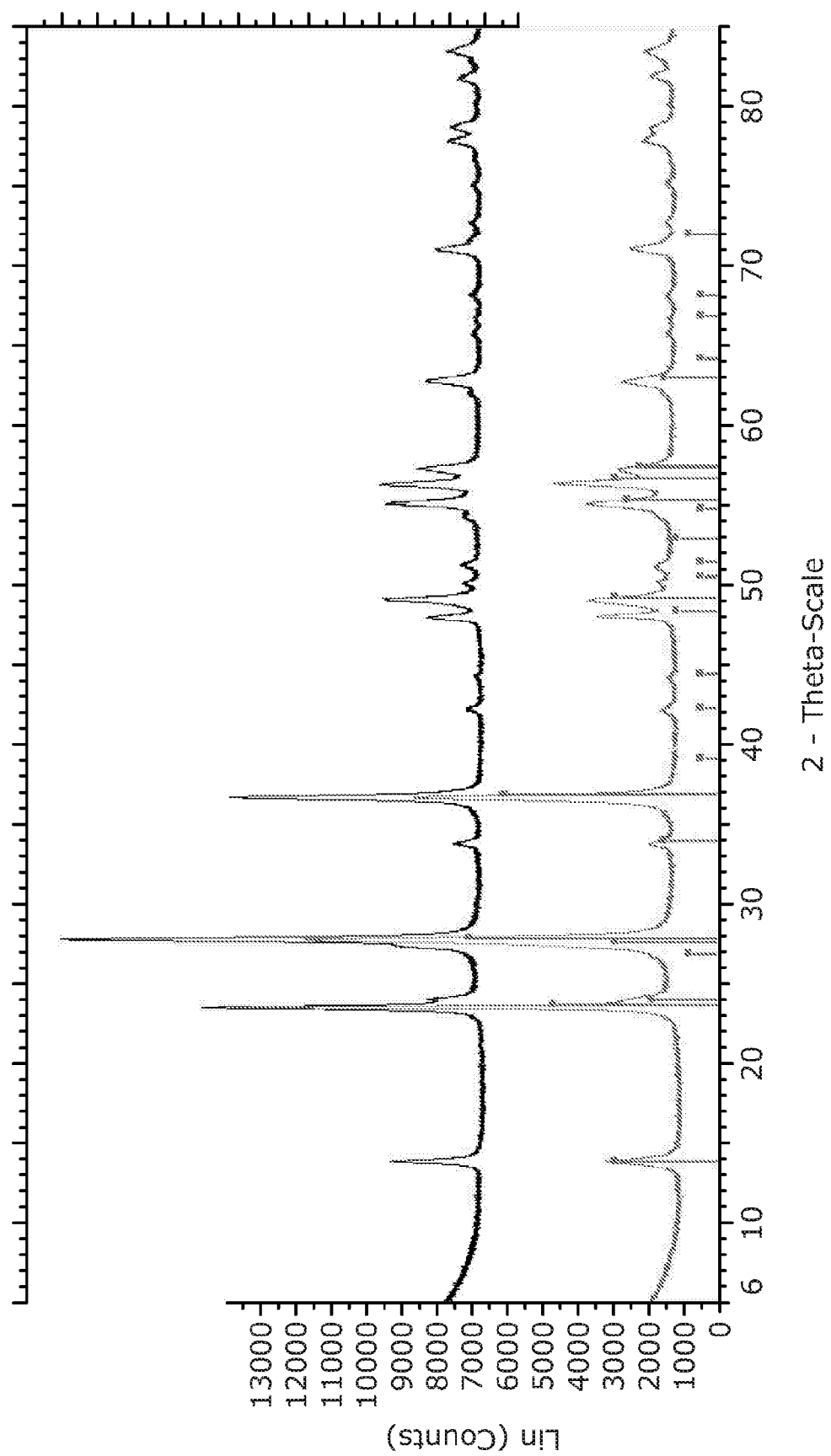

TUNGSTEN OXIDE-BASED MATERIAL

This application is a National Stage Application of PCT/GB2018/050316, filed Feb. 2, 2018, which claims priority to United Kingdom Patent Application No. 1707255.4, filed May 5, 2017.

BACKGROUND OF THE INVENTION

The present disclosure relates to a tungsten oxide.

The present invention concerns a tungsten oxide. More particularly, but not exclusively, this invention further concerns a composition comprising a tungsten oxide and a method of making a tungsten oxide.

Tungsten oxides incorporating a polyatomic cation (such as ammonium) or a metal (such as potassium) are known. Some such tungsten oxides absorb infra-red (IR) radiation and are therefore used to provide IR absorbing properties, although the IR absorbing properties of such tungsten oxides are not sufficiently high. Some tungsten oxides absorb light in the visible part of the spectrum which may be undesirable in certain circumstances, for example, where it is desired that the tungsten oxide does not have a significant deleterious effect on the visible colour of the matrix in which the tungsten oxide is dispersed.

The present invention seeks to mitigate one or more of the above-mentioned problems. Alternatively or additionally, the present invention seeks to provide an improved tungsten oxide.

SUMMARY OF THE INVENTION

In accordance with a first aspect of the present invention, there is provided a material of Formula (I)

$$M_y A_x WO_z \quad (I)$$

where M represents one or more monoatomic species,
A represents one or more polyatomic ionic species, each having an ionic radius of no more than 2 Å,
W is tungsten, O is oxygen, y is non-zero and up to and including 0.32, x is non-zero and up to and including 0.32, and z is from 2.5 to 4, provided that x+y≤0.33.

The material of the first aspect of the present invention has been found to provide IR absorbance properties.

W represents tungsten, optionally in ionic form. The tungsten may exist in more than one oxidation state.

Species A and M are typically located in the interstitial gaps or spaces in the lattice.

The material of Formula (1) may comprise a tungsten oxide lattice of tungsten and oxygen, optionally with species A and M in the interstitial gaps or spaces in the lattice.

The material of Formula (I) may comprise a lattice which is substantially devoid of any species other than oxygen and tungsten.

A optionally represents one or more polyatomic cationic species.

x is optionally at least 0.02, optionally at least 0.03, optionally at least 0.04, optionally at least 0.05, optionally at least 0.08, optionally at least 0.10, optionally at least 0.15, optionally at least 0.18, optionally at least 0.20 and optionally at least 0.25. x is optionally no more than 0.30, optionally no more than 0.28, optionally no more than 0.25, optionally no more than 0.20, optionally no more than 0.18 and optionally no more than 0.15. x may optionally be from 0.02 to 0.20, optionally from 0.02 to 0.18, and optionally from 0.02 to 0.17. x may optionally be 0.11, 0.18, 0.22 or 0.25, for example. Where x is 0.11, the ratio of A to W is 1 to 9. Where x is 0.22, the ratio of A to W is 2 to 9.

In certain cases, x is optionally from 0.02 to 0.10, optionally from 0.02 to 0.08, optionally from 0.02 to 0.06, and optionally 0.02 to 0.05. In these cases, y is optionally from 0.20 to 0.30. It has been found that certain materials containing a relatively small amount of polyatomic species (in particular, ammonium) in combination with other species can provide a material with IR absorbing properties.

In certain cases, x is from 0.10 to 0.30 and optionally from 0.10 to 0.20. It has been found that materials comprising approximately the same amount (in mols) of polyatomic species A (in particular, ammonium) and species M may provide a material with IR absorbing properties.

x refers to the total content of A. For the avoidance of doubt, A may represent more than one polyatomic species. For example, if A represents n polyatomic species, where n is 2 or more, A1, A2, ... An, then A represents $A1_{x1}, A2_{x2}, \ldots An_{xn}$, where x=Σ (x1, x2, ... xn). For example, if A represents two polyatomic species, A1 and A2, then A represents $A1_{x1}A2_{x2}$ and x=x1+x2.

y is optionally at least 0.05, optionally at least 0.08, optionally at least 0.12 and optionally at least 0.15, optionally at least 0.20 and optionally at least 0.25. y is optionally no more than 0.31, optionally no more than 0.30, optionally no more than 0.28, optionally no more than 0.25, optionally no more than 0.22, optionally no more than 0.20, optionally no more than 0.18, optionally no more than 0.15 and optionally no more than 0.10. y is optionally 0.08, 0.11, 0.15 or 0.22, for example. Where y is 0.11, the ratio of M to W is optionally 1 to 9, and where y is 0.22, the ratio of M to W optionally is 2 to 9.

In certain cases, y is optionally from 0.02 to 0.31, optionally from 0.05 to 0.30, optionally from 0.10 to 0.30 and optionally from 0.10 to 0.20. It has been found that materials comprising approximately the same amount (in mols) of polyatomic species A (in particular, ammonium) and species M may provide a material with IR absorbing properties.

In certain cases, y is optionally from 0.20 to 0.30, optionally from 0.22 to 0.30, optionally from 0.24 to 0.30, and optionally from 0.24 to 0.30. In those cases, x may optionally be from 0.02 to 0.10, optionally from 0.02 to 0.05. It has been found that certain materials containing a relatively small amount of polyatomic species (in particular, ammonium) in combination with other species can provide a material with IR absorbing properties.

y refers to the total content of M. For the avoidance of doubt, M may represent more than one monoatomic species. For example, if M represents n monoatomic species, where n is 2 or more, M1, M2, ... Mn, then M represents $M1_{y1}$, $M2_{y2}, \ldots Mn_{yn}$, where x=Σ (y1, y2, ... yn). For example, if M represents two monoatomic species, M1 and M2, then M represents $M1_{x1}M2_{x2}$ and y=y1+y2.

Optionally, x+y≥0.15, x+y≥0.18, x+y≥0.20, x+y≥0.23, x+y≥0.25, optionally x+y≥0.28, optionally x+y≥0.30, optionally x+y≥0.31, optionally x+y≥0.32 and optionally x+y=0.33.

M optionally represents one or more monoatomic species. M is optionally one or more monoatomic ion. Each species of M optionally has an ionic or atomic radius of no more than 2 Å. M optionally represents a plurality of monoatomic species, optionally two monoatomic species, optionally two monoatomic ions. One or more of the species of M may be metal species. M may represent one or more monoatomic metal species, optionally a plurality of monoatomic metal species, optionally two monoatomic metal species. M may comprise (or optionally represent) one or more of: H, He, alkali metal (Group I), alkaline earth metal (Group II), rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, Cl, P, S, Se, Br, Te, Ti, Nb, V, Mo, Ta, Re, Be, Hf, Os, Bi and I.

M may comprise (or optionally represent) one or more of an alkali metal, an alkaline earth metal, rare earth element, Zr, Cu, Ag, Zn, Al, Ga, In, Tl, Ge, Sn, Pb, Sb, Ti, Nb, V, Mo, Ta, Re, Be, Hf, and Bi. M may comprise (or optionally represent) one or more of an alkali metal, alkaline earth metal, rare earth element, Zr, In, Tl, Ge, Sn, Pb, Sb, Ti, Nb, V, Mo and Ta. M may comprise (or optionally represent) one or more of an alkali metal, an alkaline earth metal, Ti, Zr, Hf, Ge, Sn, Pb, Nb, Mo, Ta. M may comprise (or optionally represent) one or more of an alkali metal, an alkaline earth metal, Sn and Pb. M optionally comprises (or optionally represents) one more of an alkali metal (in particular one or more of sodium, potassium and caesium), Sn and Pb; optionally one or more of an alkali metal and one of Sn or Pb. It has been found that Sn and alkali (Group I) metals (either alone or in combination) may be effective at providing a material with good IR absorbance properties, when used in combination with polyatomic species A (in particular, ammonium).

If M represents a plurality of monoatomic species, then preferably each of said monoatomic species may be selected from H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, Cl, P, S, Se, Br, Te, Ti, Nb, V, Mo, Ta, Re, Be, Hf, Os, Bi and I. If M represents a plurality of monoatomic species, then optionally each of said monoatomic species may be selected from an alkali metal, an alkaline earth metal, rare earth element, Zr, Cu, Ag, Zn, Al, Ga, In, Tl, Ge, Sn, Pb, Sb, Ti, Nb, V, Mo, Ta, Re, Be, Hf, and Bi. If M represents a plurality of monoatomic species, then optionally each of said monoatomic species may be selected from an alkali metal, alkaline earth metal, rare earth element, Zr, In, Tl, Ge, Sn, Pb, Sb, Ti, Nb, V, Mo and Ta. If M represents a plurality of monoatomic species, then optionally each of said monoatomic species may be selected from an alkali metal, an alkaline earth metal, Ti, Zr, Hf, Ge, Sn, Pb, Nb, Mo, Ta. If M represents a plurality of monoatomic species, then optionally each of said monoatomic species may be selected from an alkali metal, an alkaline earth metal, Sn and Pb. M optionally represents one or more alkali metal (optionally one alkali metal, optionally two alkali metals) and either Sn or Pb.

M may comprise one or more Group I element, optionally as an ion, and/or one or more Group II element, optionally as an ion, optionally in combination with a further monoatomic species, such as a monoatomic metal species, optionally selected from the group consisting of Ti, Zr, Hf, Ge, Sn, Pb, Nb, Mo, and Ta, optionally selected from the group consisting of Pb, and Sn, optionally Sn, optionally an ion. M may comprise one or more of Na, K, Cs, Mg, Ca, Sr or Ba, (optionally one or more of Na, K and Cs), optionally in ionic form, optionally in combination with a further monoatomic species, such as a monoatomic metal species, optionally selected from the group consisting of Ti, Zr, Hf, Ge, Sn, Pb, Nb, Mo, and Ta, optionally selected from the group consisting of Pb and Sn, optionally Sn, optionally in ionic form, such as an ion of Sn. M may comprise one or both of Na and Cs, optionally in ionic form, optionally in combination with a further monoatomic species, such as a monoatomic metal species, such as an ion of Sn.

M may comprise one or more of Ti, Zr, Hf, Ge, Sn, Pb, Nb, Mo and Ta, (optionally one or both of Pb and Sn) optionally as an ion, optionally in combination with one or more further monoatomic species, such as one or more Group I element, optionally in ionic form, and/or one or more Group II element, optionally in ionic form. M may comprise one or more of Ti, Zr, Hf, Ge, Sn, Pb, Nb, Mo and Ta, (optionally one or both of Pb and Sn), in combination with ion(s) of one or more of Na, K, and Cs, optionally ion(s) of one or both of Na and Cs, optionally ion(s) of Na and optionally ion(s) of Cs. M may comprise Sn (optionally in ionic form), optionally in combination with (i) $Na^+$ and $Cs^+$, (ii) $Na^+$ and $K^+$, (iii) $K^+$ and $Cs^+$ or (iv) $Na^+$, $K^+$ and $Cs^+$.

The material of formula (I) may be of formula (II), where x is from 0.10 to 0.20 (optionally from 0.15 to 0.20), y is from 0.10 to 0.20 (optionally from 0.15 to 0.20), where A represents ammonium, x+y≥0.30, and M represents one or more of an alkali metal, Ti, Zr, Hf, Ge, Sn, Pb, Nb, Mo and Ta, optionally one or more of Li, Na, K, Cs, Rb, Pb and Sn, and optionally one or more of Na, K, Cs, Pb and Sn, optionally one of Na, K, Cs, Pb and Sn. It has been found that such materials may be effective at providing IR absorbing properties.

The material of formula (I) may be of formula (III), where x is from 0.02 to 0.10 (optionally from 0.02 to 0.08, optionally from 0.03 to 0.06), y is from 0.20 to 0.31, x+y≥0.30, A represents a single polyatomic species, such as ammonium, and M represents one or more of Na, K, Cs, Mg, Ca, Ti, Zr, Hf, Ge, Sn, Pb, Nb, Mo and Ta. Optionally, M represents one or more of Na, K, Cs, Ti, Zr, Hf, Ge, Sn, Pb, Nb, Mo and Ta. Optionally, M represents one or more of Na, K, Cs, Sn, Pb, Nb, Mo and Ta. Optionally, M represents one or more of Na, K and Cs, and one or more of Sn, Pb, Nb, Mo and Ta. Optionally, M represents one or more of Na, K and Cs, and one or both of Sn and Pb; in this case, y for Na, K and Cs is optionally from 0.10 to 0.28 (optionally from 0.15 to 0.25) and y for Sn and Pb is from 0.02 to 0.15 (optionally from 0.05 to 0.15).

A optionally represents one or more polyatomic species, such as one or more polyatomic cation, such as ammonium.

A optionally represents one (and only one) polyatomic species, such as a polyatomic ion, such as a polyatomic cation, such as ammonium. Ammonium has been found, in combination with other dopants, under certain circumstances to increase IR absorbing properties.

A optionally represents a plurality of polyatomic species, such as polyatomic cations.

A may comprise one or more of $NH_4^+$, $H_3O^+$, $VO^{2+}$, $H_2F^+$ and $H_3S^+$, for example $NH_4^+$ in combination with one or more of $H_3O^+$, $VO^{2+}$, $H_2F^+$ and $H_3S^+$. A may comprise $NH_4^+$ and $H_3O^+$, or $NH_4^+$ and $VO^{2+}$, or $NH_4^+$ and $H_2F^+$, or $NH_4^+$ and $H_3S^+$.

A may comprise a metal (typically in combination with other elements). A may not contain a metal.

Optionally, A represents $NH_4^+$. Optionally, M represents Sn (optionally in combination with a Group I element or a Group II element), and y is optionally at least 0.02, optionally 0.08 or 0.15.

z may be from 2.5 to 3.5, optionally from 2.5 to 3.2 and optionally from 2.7 to 3.1 and optionally from 2.9 to 3.1. z may be at least 2.7, optionally at least 2.8, optionally at least 3.0 and optionally at least 3.2. z may optionally be no more than 3.5 and may optionally be up to and including 3.3. z may be 3 (the material optionally comprising $WO_3$).

The tungsten oxide of Formula (I) of the first aspect of the present invention is a single phase material, not a mixture or blend of a plurality of different materials, or a monoatomic species or polyatomic species merely blended with a tungsten oxide carrier. This may be demonstrated using x-ray diffraction. The single phase material will typically generate a diffraction pattern characteristic of that material. A mixture or blend of different materials will generate an x-ray diffraction pattern for each different material. Similarly, if a monoatomic material is blended into a carrier, such as $WO_3$, one would expect to observe an x-ray diffraction pattern from the carrier and possibly an x-ray diffraction pattern from the monoatomic material.

In accordance with a second aspect of the present invention, there is provided a composition comprising a material of Formula (I) dispersed in a carrier.

The carrier may, for example, comprise an evaporable liquid, such as those used in coatings. The evaporable liquid may be aqueous or non-aqueous. The word "evaporable" indicates that the liquid (or a sufficiently large proportion thereof) evaporates in the conditions in which the composition is to be used, typically to provide a coating. For example, "evaporable" may indicate that, in use, the liquid evaporates at 20° C. in a period of no more than 12 hours, optionally to provide a coating.

The carrier may optionally be liquid or solid. The carrier may be a liquid which is treatable (for example after evaporation of the liquid or a large proportion of the liquid) so as to form a solid. The subsequently-formed solid after treatment to form a solid comprises the material of Formula (I) dispersed in said solid.

The amount of material of Formula (I) dispersed in the carrier will depend on the intended use of the composition. Optionally, sufficient material of Formula (I) is present to provide effective infra-red (IR) absorption/shielding characteristics. Such absorption/shielding characteristics may optionally be measured at a nominal wavelength of 1039 nm.

In accordance with a third aspect of the present invention, there is provided a method of making a material of Formula (I), the method comprising providing in admixture monoatomic species M (or a source thereof), polyatomic species A (or a source thereof) and a source of $WO_z$.

The source of $WO_z$ may comprise a tungsten (VI) species and a reducing agent, such as a reducing acid, such as lactic acid or citric acid, optionally lactic acid.

The source of $WO_z$ may comprise tungstic acid, a metatungstate, a paratungstate or a tungstate ($WO_4^{2-}$). Tungstic acid may be provided, for example, by passing a tungstate through an ion exchange resin. The source of $WO_z$ may also provide one or more of polyatomic species A and species M. For example, sodium tungstate and ammonium metatungstate may be used to provide $WO_z$, and sodium and ammonium ions to be incorporated into the material.

The monoatomic species M (or source thereof), polyatomic species A (or source thereof) and a source of $WO_z$ are optionally provided in admixture in acidic conditions, optionally at a pH of no more than 3, optionally no more than 2.5, optionally no more than 2, optionally no more than 1.5 and optionally from 1.0 to 1.5.

The method may comprise heating said admixture to form a product. The admixture may be heated for at least 5 hours, optionally for at least 6 hours, optionally for at least 10 hours, optionally for at least 20 hours, optionally for at least 30 hours, optionally for at least 40 hours, optionally for at least 50 hours, optionally at least 60 hours and optionally at least 70 hours.

The method may comprise heating said admixture for no more than 90 hours, optionally no more than 80 hours, optionally no more than 70 hours, optionally no more than 60 hours, optionally no more than 50 hours and optionally no more than 40 hours.

The method may comprise heating said admixture for 5-100 hours, optionally for 10-100 hours, optionally for 20-90 hours and optionally for 40-80 hours.

The method may comprise heating the admixture to a temperature of at least 100° C., optionally at least 120° C., optionally at least 140° C., optionally at least 150° C., optionally at least 160° C., optionally at least 170° C., optionally at least 180° C. and optionally at least 190° C.

The method may comprise heating the admixture to a temperature of no more than 250° C., no more than 240° C., no more than 220° C. and optionally no more than 200° C.

The method may comprise heating the admixture to a temperature of 100-220° C., optionally of 140-200° C. and optionally of 150-190° C.

The product so formed may be filtered and/or dried and/or heated in an inert atmosphere. The product so formed is optionally filtered, dried and heated in an inert atmosphere. In the present context, an inert atmosphere is one which does not contain a significant amount of oxygen (such as would oxidise one or more of the components of the material of Formula (I)). Heating in an inert atmosphere may comprise heating to a temperature of at least 100° C., optionally at least 200° C., optionally at least 300° C., optionally at least 400° C. and optionally at least 500° C. Heating in an inert atmosphere may comprise heating to a temperature of no more than 800° C., optionally no more than 700° C., optionally no more than 600° C., optionally no more than 500° C. and optionally no more than 400° C. Heating in an inert atmosphere may comprise heating to a temperature of 100-800° C. and optionally of 100-600° C. Heating in an inert atmosphere may comprise heating for up to 10 hours, optionally up to 8 hours, optionally up to 6 hours, optionally up to 4 hours and optionally up to 2 hours. Heating in an inert atmosphere may comprise heating for at least 0.5 hours and optionally for at least 1 hour. Heating in an inert atmosphere may comprise heating for 0.5-10 hours, for 0.5-6 hours and for 0.5-4 hours.

In accordance with a fourth aspect of the present invention, there is provided a method of providing infrared absorbing capability to an object, the method comprising providing said object with a material of Formula (I).

The method of the fourth aspect of the present invention may comprise providing said object with a composition in accordance with the second aspect of the present invention. The method may comprise providing said object with a liquid composition in accordance with the second aspect of the present invention, and then forming a solid composition from the liquid composition (for example, by permitting evaporation of one or more components of the liquid composition).

It will of course be appreciated that features described in relation to one aspect of the present invention may be incorporated into other aspects of the present invention. For example, the method of the invention may incorporate any of the features described with reference to the material of the invention and vice versa.

DESCRIPTION OF THE DRAWINGS

Embodiments of the present invention will now be described by way of example only with reference to the accompanying FIGURE, FIG. 1, which shows x-ray diffraction data for an exemplary embodiment of a tungsten oxide in accordance with the present invention and comparative examples.

DETAILED DESCRIPTION

The synthesis of exemplary embodiments of various materials of formula (I) in accordance with the present invention will now be described.

Example 1

Sodium tungstate solution (6.6 g in 100 ml water) was passed through an ion exchange column to form tungstic acid. Lactic acid (90%, 6.03 g, Alfa Aesar) was added, followed by ammonium bicarbonate (0.57 g, VWR International), and tin powder (0.36 g, Royal Metal Powders). The mixture was heated in an autoclave to 150° C. for about 48 hours to afford the product, which is separated by filtration, dried under vacuum and heated under a flow of nitrogen at 500° C. for 1 hour to provide a material of expected formula $(NH_4)_{0.18}Sn_{0.15}WO_3$. XPS data indicate that the oxygen content is from 2.7 to 3.1. XRF showed that the tin content is 0.15. Kjeldahl analysis showed the presence of ammonium in the material at a level of at least 0.04. It is noted that the material is defined as having "a minimum content" of ammonium due to the insolubility of the material. It is well-known in the field that for Kjeldahl analysis where a product is not fully soluble this can lead to a result showing lower ammonium content than expected, or shown in other methods of analysis. This the amount of ammonium measured in the sample is defined as ammonium content. For the material of Example 1, the ammonium dopant was added in excess and the applicant has no reason to believe that the interstitial sites in the tungsten oxide are not completely filled. Furthermore, the IR absorbance performance which is described below for the material of Example 1 is consistent with a high level of doping. Thus it is expected that the level of ammonium is from 0.04 to 0.15; and more particularly, it is expected that the level of ammonium is 0.15.

All reagents were used as supplied.

Example 2

A further method may be used to prepare exemplary embodiments of materials in accordance with the first aspect of the present invention. A metal tungstate (such as sodium tungstate [3.34 g]), ammonium metatungstate [2.25 g, Alfa Aesar], and lactic acid (90%, 6.03 g) are dissolved to a clear solution, tin (0.36 g) and then sulfuric acid is added to a pH of 1.1. The mixture is then heated in an autoclave at 190° C. for 40 hours. The solid product is separated by filtration, dried under vacuum, then heated under a nitrogen flow at 500° C. for 1 hour. The resulting tungsten oxide was of formula $Na_{0.19}(NH_4)_{0.03}Sn_{0.11}WO_3$. The tin and sodium content were measured using XRF. It is expected that the sodium content here is a maximum content, and may be slightly lower than measured using XRF. Kjeldahl analysis showed a minimum ammonium content of 0.03, and may be slightly higher, given that the material of Example 2 was not completely soluble in the solvent used which would tend to produce a lower than expected measurement in the Kjeldahl analysis. The total content of sodium, ammonium and tin is expected to be about 0.33.

Example 3

Sodium tungstate dihydrate (6.6 g, 0.02 mol, Alfa Aesar) was dissolved in DI water to a volume of 100 ml. This solution was passed through a column of acid form cation exchange resin to form tungstic acid. 90% Lactic acid (6.0 g) was added to give a clear, colourless solution. Ammonium bicarbonate (0.61 g, 7.72×10⁻³ mol, VWR) and sodium carbonate (0.37 g, 3.49×10⁻³ mol, Solvay) were added to form a clear colourless solution. This solution was transferred to a hydrothermal reactor (volume 200 ml), which was heated to 190° C. for 72 hours. The blue product was separated by filtration, washed with water, then dried under vacuum at 40° C. The afforded solid was then annealed at 500° C. for 1 hour under a flow of $N_2$. The product is expected to have formula $Na_{0.165}(NH_4)_{0.165}WO_3$.

Example 4

Sodium tungstate solution (6.6 g in 100 ml water) was passed through an ion exchange column to form tungstic acid. Lactic acid (80%, 6.6 g) was added, followed by ammonium bicarbonate (0.54 g) and lead nitrate (1.13 g, VWR). The mixture was heated in an autoclave to 190° C. for about 72 hours to afford the product, which is separated by filtration, dried under vacuum and heated under a flow of nitrogen at 500° C. for 1 hour to provide a material of expected formula $(NH_4)_{0.165}Pb_{0.165}WO_3$.

Example 5

Sodium tungstate solution (6.6 g in 100 ml water) was passed through an ion exchange column to form tungstic acid. Lactic acid (80%, 6.6 g) was added, followed by ammonium bicarbonate (0.54 g) and potassium carbonate (0.23 g, VWR). The mixture was heated in an autoclave to 190° C. for about 72 hours to afford the product, which is separated by filtration, dried under vacuum and heated under a flow of nitrogen at 500° C. for 1 hour to provide a material of expected formula $(NH_4)_{0.165}K_{0.165}WO_3$.

Comparative examples were also synthesised so that their properties could be compared to those of the Examples.

Comparative Example 1

A material of formula $(NH_4)_{0.33}WO_3$ was made using a method substantially the same as that described in relation to Example 1, but without any tin. The reaction time was 72 hours as in Example 1, and the reaction temperature was 150° C.

Comparative Example 2

A material of formula $Sn_{0.2}WO_3$ was made using a method substantially the same as that described in relation to Example 1, but without any ammonium bicarbonate and without heating in nitrogen. The mass of tin used was 0.48 g.

Comparative Example 3

Sodium tungstate solution (6.6 g in 100 ml water) was passed through an ion exchange column to form tungstic acid. Lactic acid (90%, 6.03 g, Alfa Aesar) was added, followed by caesium carbonate (1.5 g, Alfa Aesar). The mixture was heated in an autoclave to 190° C. for about 48 hours to afford the product, which is separated by filtration, dried under vacuum and heated under a flow of nitrogen at 500° C. for 1 hour to provide a material of formula $Cs_{0.33}WO_3$.

Comparative Example 4

Sodium tungstate dihydrate (6.6 g, 0.02 mol) was dissolved in DI water to a volume of 100 ml. This solution was passed through a column of acid form cation exchange resin to form tungstic acid. 90% Lactic acid (6.0 g) was added to give a clear, colourless solution. Sodium carbonate (0.7 g, $6.6 \times 10^{-3}$ mol) was added to form a clear colourless solution. This solution was transferred to a hydrothermal reactor (volume 200 ml), which was heated to 190° C. for 48 hours. The blue product was separated by filtration, washed with water, then dried under vacuum at 40° C. The afforded solid was then annealed at 500° C. for 1 hour under a flow of $N_2$. A material of expected formula $Na_{0.33}WO_3$ was provided.

Comparative Example 5

Sodium tungstate solution (6.6 g in 100 ml water) was passed through an ion exchange column to form tungstic acid. Lactic acid (80%, 6.6 g) was added, followed by lead nitrate (2.25 g). The mixture was heated in an autoclave to 190° C. for about 72 hours to afford the product, which is separated by filtration, dried under vacuum and heated under a flow of nitrogen at 500° C. for 1 hour to provide a material of expected formula $Pb_{0.33}WO_3$.

Comparative Example 6

Sodium tungstate dihydrate (6.6 g, 0.02 mol) was dissolved in deionised water to a total volume of 100 ml. This solution was passed through an acid form ion exchange resin to produce tungstic acid solution. To this, 6.0 g 90% lactic acid solution was added, followed by potassium sulfate (5.0 g, 0.0287 mol). The suspension was transferred to a 200 ml hydrothermal reaction bomb. This was heated to 190° C. for 72 hours to afford the product which is separated by filtration, dried under vacuum and heated under a flow of nitrogen at 500° C. for 1 hour to provide a material of formula $K_{0.33}WO_3$.

Comparative Example 7

Sodium tungstate dihydrate (6.7 g, 0.02 mol) was dissolved in DI water to a volume of 100 ml and 90% lactic acid (6 g) added. 20% sulfuric acid was added to a pH of 1.1, then tin (0.36 g, $3.03 \times 10^{-3}$ mol) added. This mixture was transferred to a hydrothermal reactor (volume 200 ml), which was heated to 190° C. for 48 hours. The blue product was separated by filtration, washed with water, then dried under vacuum at 40° C. The afforded solid was then annealed at 500° C. for 1 hour under a flow of $N_2$ to yield a material of expected formula $Na_{0.18}Sn_{0.15}WO_3$.

The materials of Example 1 and Comparative Examples 1 and 2 were characterised by x-ray diffraction.

X-ray diffraction measurements were performed on powder samples at room temperature (about 25° C.) using a Bruker D8 Advance diffractometer (Cu K, radiation, 1.54 Å wavelength, tube operated at 40 kV, 40 mA) over a 2-theta range of 5 to 85 degrees. Diffraction patterns are shown in FIG. 1, the darker continuous line being from Example 1, the lighter continuous line being from Comparative Example 2 and the vertical lines showing peak position being from Comparative Example 1.

The x-ray diffraction data of FIG. 1 show that the material of Example 1 generates a different diffraction pattern from each of Comparative Examples 1 and 2, and that the diffraction pattern of Example 1 is not merely a combination of the diffraction patterns of Comparative Examples 1 and 2 which may be expected, for example, for a mixture of Comparative Examples 1 and 2.

The infra-red absorption characteristics of the materials of the Examples and the Comparative Examples were examined as described below. The material was dispersed at a concentration of 0.01% w/v in deionised water. Those skilled in the art will realise that % w/v is calculated based on the weight of the infra-red absorbing material in grams per 100 ml of deionised water. The IR absorbance characteristics of the suspensions were measured at a nominal wavelength of 1039 nm using a Hach DR2000 or a Hach DR3900 spectrometer, a cell of 10 mm path length and a reference sample provided with deionised water. The absorbance measurements are shown in Table 1 below.

TABLE 1

| absorbance measurements | |
|---|---|
| Material | IR absorbance (arbitrary units) |
| Example 1 | 1.86 |
| Example 2 | 2.01 |
| Example 3 | 0.64 |
| Example 4 | 1.13 |
| Example 5 | 0.70 |
| Comparative Example 1 | 0.56 |
| Comparative Example 2 | 1.43 |
| Comparative Example 3 | 1.40 |
| Comparative Example 4 | 0.31 |
| Comparative Example 5 | 0.90 |
| Comparative Example 6 | 0.60 |
| Comparative Example 7 | 1.43 |

It can be observed that the absorbance shown by the material of Example 1 (containing ammonium and tin) is far greater (and unexpectedly so) than the absorbance values demonstrated by Comparative Example 1 (containing ammonium only) and Comparative Example 2 (containing tin only).

Example 2 (containing ammonium, tin and sodium) also shows an unexpectedly high IR absorbance (2.01) compared to Comparative Example 1 (ammonium only, absorbance of 0.56), Comparative Example 2 (tin only, absorbance of 1.43), Comparative Example 4 (sodium only, absorbance of 0.31) and Comparative Example 7 (sodium and tin, absorbance of 1.43).

Furthermore, the material of Example 3 ($Na_{0.165}(NH_4)_{0.165}WO_3$) unexpectedly shows a higher absorbance (0.64) than the material which contains solely sodium (Comparative Example 4, absorbance of 0.31) and the material which contains solely ammonium (Comparative Example 1, absorbance of 0.56).

Similarly, unexpectedly high absorbance values are observed from Examples 4 and 5. Example 4 containing ammonium and lead shows an unexpectedly high absorbance value of 1.13, given the absorbance values of Comparative Example 1 (ammonium only, absorbance of 0.56) and Comparative Example 5 (lead only, absorbance of 0.90). It is worth noting that the absorbance at 600 nm (yellow-orange) for Example 4 (0.43) was very similar to that measured for Comparative Example 5 (0.38), indicating that an appreciable increase in IR absorbance can be achieved without an appreciable increase in absorbance at visible wavelengths. Example 5 containing ammonium and potassium shows an unexpectedly high absorbance value of 0.70, given the absorbance values of Comparative Example 1 (ammonium only, absorbance of 0.56) and Comparative Example 6 (potassium only, absorbance of 0.60).

It has therefore been found that if ammonium is incorporated into tungsten oxide in combination with other species (such as metals, such tin, lead and/or Group I metals), then the IR absorbance properties of the resulting material is higher than expected.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The examples above illustrate the use of ammonium as the single polyatomic cation. Those skilled in the art will realise that it would be possible to use more than one polyatomic cation, for example, ammonium and $H_2F^+$. Furthermore, if only a single polyatomic cation were to be used, then this need not be ammonium. For example, $H_2F^+$ may be used.

The examples above illustrate the use of particular stoichiometric amounts of polyatomic cation and metal. Those skilled in the art will realise that alternative amounts may be used.

The examples above illustrate the use of various metals with ammonium. Those skilled in the art will realise that other metals and combinations of metals may be used.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A material consisting of Formula (I)

$$M_yA_xWO_z \qquad (I)$$

where M represents one or more monoatomic species, each being selected from the group consisting of an alkali metal, an alkaline earth metal, a rare earth species, Zr, Cu, Ag, Zn, Al, Ga, In, Tl, Ge, Sn, Pb, Sb, Ti, Nb, V, Mo, Ta, Re, Be, Hf, and Bi, A represents $NH_4^+$, W is tungsten, O is oxygen, $0.08 \leq y \leq 0.30$, $0.02 \leq x \leq 0.30$, and z is from 2.5 to 4.0, provided that $0.30 \leq (x+y) \leq 0.33$.

2. The material according to claim 1, wherein $x+y=0.33$.

3. The material according to claim 1, wherein M represents one or more monoatomic species, each being selected from the group consisting of an alkali metal, an alkaline earth metal, Ti, Zr, Hf, Ge, Sn, Pb, Nb, Mo and Ta.

4. The material according to claim 1, wherein M represents one alkali metal and either Sn or Pb.

5. The material according to claim 1, wherein M comprises one or more alkali metal and Sn.

6. The material according to claim 1, wherein x is from 0.10 to 0.20, y is from 0.10 to 0.20, where M represents one or more of an alkali metal, Ti, Zr, Hf, Ge, Sn, Pb, Nb, Mo and Ta.

7. The material according to claim 1, wherein x is from 0.02 to 0.10, y is from 0.20 to 0.30, and M represents one or more of Na, K and Cs, and one or more of Sn, Pb, Nb, Mo and Ta.

8. The material according to claim 1, wherein M represents one or more monoatomic species, each of which is selected from the group consisting of an alkali metal, Ge, Sn, Pb, Nb, Mo and Ta.

9. A composition comprising the material of claim 1 dispersed in a carrier.

10. A method of making the material according to claim 1, the method comprising providing in admixture monoatomic species M (or source thereof), polyatomic species A (or source thereof) and a source of $WO_z$.

11. The method according to claim 10, wherein the source of $WO_z$ comprises a Tungsten (VI) species and a reducing agent.

12. A method of providing infrared absorbing capability to an object, the method comprising providing said object with the material of claim 1.

* * * * *